United States Patent [19]

Seeley

[11] 4,448,213

[45] May 15, 1984

[54] WATER VALVE

[75] Inventor: Frederic F. Seeley, St. Marys, Australia

[73] Assignee: F. F. Seeley Nominees Pty. Ltd., St. Marys, Australia

[21] Appl. No.: 479,643

[22] Filed: Mar. 28, 1983

[30] Foreign Application Priority Data

Mar. 29, 1982 [AU] Australia .................. PF3347

[51] Int. Cl.³ .................. F16K 31/18; F16K 29/00
[52] U.S. Cl. .................. 137/451; 137/330; 137/448
[58] Field of Search .............. 137/330, 331, 434, 444, 137/447, 448, 451, 443

[56] References Cited

U.S. PATENT DOCUMENTS

| 326,143 | 9/1885 | Page | 137/448 |
|---|---|---|---|
| 386,242 | 7/1888 | Fry | 137/451 |
| 767,848 | 8/1904 | Stillman | 137/444 |
| 1,616,875 | 2/1927 | Scheibeler | 137/451 |
| 3,202,173 | 8/1965 | Szwargulski | 137/426 |
| 3,207,170 | 9/1965 | Fulton | 137/444 |
| 3,298,231 | 1/1967 | Zukley | 137/426 |
| 3,331,387 | 7/1967 | Walters | 137/426 |
| 3,334,649 | 8/1967 | Thompson | 137/331 |
| 3,361,156 | 1/1968 | Klingle, Sr. | 137/426 |
| 3,454,036 | 7/1969 | Thompson | 137/444 |

Primary Examiner—George L. Walton
Attorney, Agent, or Firm—Jay L. Chaskin

[57] ABSTRACT

A float valve in this invention has a hollow body having a spigot adjacent an orifice, a valve seat surrounding the orifice, a float arm pivoted to the hollow body, and an abutment surface on the float arm engageable against an elastomeric valve member when carried by the spigot.

8 Claims, 3 Drawing Figures

WATER VALVE

This invention relates to a float-type water valve which is useful for light operation wherein small quantities of water need to be added to a container, as for example in an evaporative cooler system.

BACKGROUND OF THE INVENTION

Float valves in common use require to pass water at the rate of about 10 liters per minute or more, and consequently the float arrangement must be capable of closing off a valve aperture which usually exceeds 5 mm in diameter and can be subject to pressure of up to 200 p.s.i. (2200 kPa). This imposes a requirement for large size floats of a high strength and heavy construction far beyond what is required to fill the tray of an evaporative cooler, and the main object of this invention is to provide a satisfactory float valve which is of low cost but will amply fulfil those requirements.

As is well known, the most troublesome feature of any float valve is the elastomeric valve member which is required to close against a seat, and another object of this invention is to provide an improvement whereby an elastomeric valve member may be readily repositioned to present a new face to a valve seat.

A float valve in this invention has a hollow body having a spigot adjacent an orifice, a valve seat surrounding the orifice, a float arm pivoted to the hollow body, and an abutment surface on the float arm engageable against an elastomeric valve member when carried by the spigot.

More specifically, the invention consists of a float valve having walls defining a hollow body, a valve seat on one end of the body surrounding orifice walls, a spigot adjacent the valve seat, an elastomeric valve member having an aperture the walls of which engage the spigot, a float arm, pivot means pivotally interconnecting the float arm to the hollow body at its valve end, the float arm having a float on the other end, and an abutment surface on its valve end engageable against the valve member to urge it into sealable engagement with the valve seat upon hinging of the float arm in one direction.

BRIEF DESCRIPTION OF THE DRAWINGS

An embodiment of the invention is described hereunder in some detail with reference to, and is illustrated in, the accompanying drawings, in which.

Figure 1:
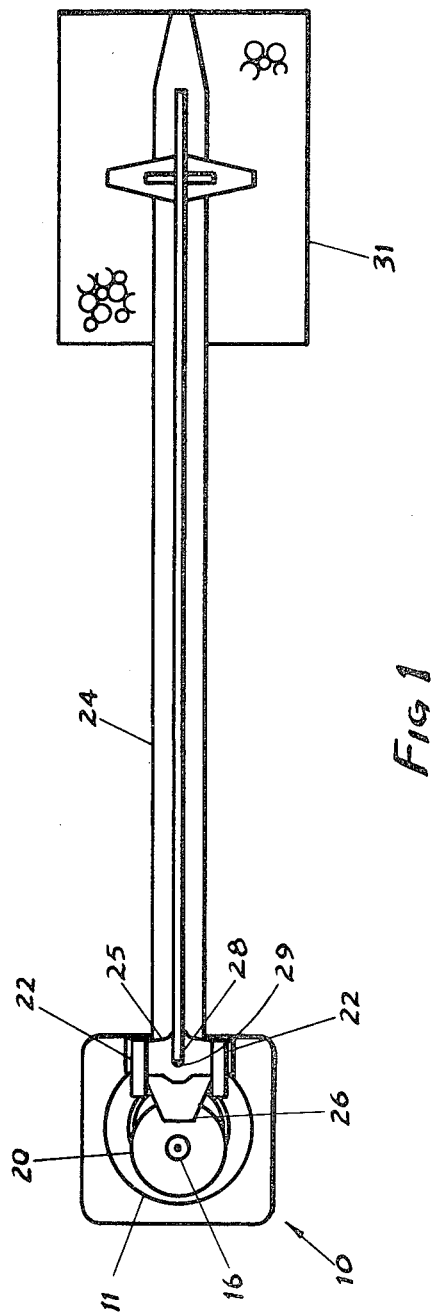
FIG. 1 is a plan view of a float valve.
Figure 2:
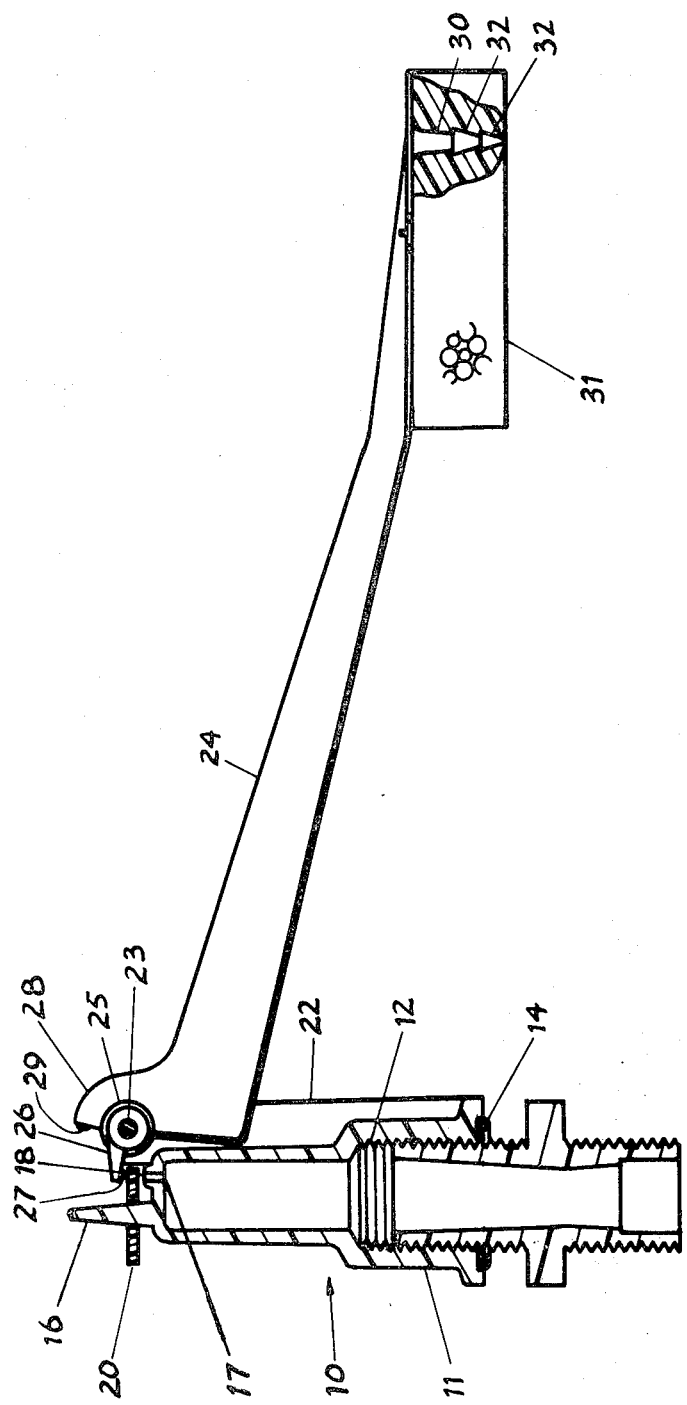
FIG. 2 is a central elevational section.
Figure 3:
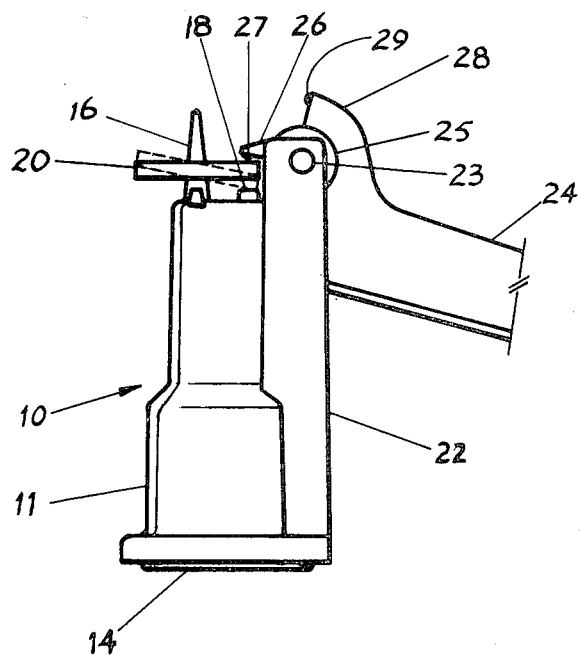
FIG. 3 is an enlarged elevation of the valve body portion.

In this embodiment a float valve 10 comprises a hollow valve body 11 having a female thread 12 at its base end and arranged to receive a fitting, for example a hose fitting having a nipple, which also has the effect of retaining the valve to the wall of a container. Sealing is effected by an "O-ring" seal 14 in the base end of the valve body 11.

At the upper end of the valve body 11 is an outstanding partly conical spigot 16 which is alongside a valve orifice 17, the valve orifice being surrounded by a valve seat 18. The partly conical spigot 16 is arranged to support a washer-like or annular elastomeric valve member 20 which will co-operate with the valve seat 18 when pushed downwardly on to it, the closure movement of the valve member being a tilting movement, a distortion of the elastomeric material, or both.

The valve body 11 also has a pair of outstanding ribs 22 which terminate a little above the valve seat and to one side thereof, and which contain a pair of aligned apertures, the aligned apertures receiving a pivot pin 23, and the ribs flanking the float arm 24.

A float arm 24 is provided with a central boss 25 at one end through which the pivot pin 23 also passes, the arm pivoting about the pivot pin at that point. Projecting forwardly from the arm is a finger 26 having an abutment projection 27, and this is surmounted by a recess portion with another finger 28 having a second abutment projection 29 spaced 90 degrees from the first so that the body can be mounted either vertically or horizontally. The other (float) end of the arm is moulded with spigots 30 which penetrate and retain a foam polystyrene float 31 with spigot barbs 32. The polystyrene float can if required be contained within a light plastic float container to prevent deterioration. There may also be provided a splash cap (not shown) which fits over the top of the body, the splash cap being a member of general U-shape both in elevation and end elevation, and retaining the pin against lateral dislodgement.

As an alternative to the hose fitting described above, the valve body can be provided with a double male ended threaded nipple for threadably engaging the sleeve of a pipe network.

A brief consideration of the above embodiment will indicate that the invention results in an extremely simple float valve of very low cost which is nevertheless very practical in the valve member replacement is limited, and all the elements are so simple in design that maintenance is reduced to a minimum. Every component in the described embodiment will be seen to be of polymeric material and therefore less likely to deteriorate than corresponding metal elements. It will also be seen that there is a wide dimensional tolerance inherent in all the working parts and this results in a valve which is likely to work even under adverse conditions. The valve member 20, in being annular, may be rotated about spigot 16 to present a new face to the valve seat 18. There is a complete absence of sliding surfaces.

Various modifications in structure and/or function may be made by one skilled in the art to the disclosed embodiments without departing from the scope of the invention as defined by the claims.

I claim:

1. A float valve having walls defining a hollow valve body, a valve seat disposed exteriorly on one end of the body and defining an outlet orifice, a valve member locating spigot being disposed exteriorly of the valve body and adjacent the valve seat and being integral with the valve body, a resilient washer-like valve member having aperture forming walls surrounding and engaging the spigot and being freely rotatable thereabout, a float arm, pivot means pivotally interconnecting the float arm at a first end to the valve body, the float arm having a float at a second end, and an abutment surface on the first end engageable against a portion of the washer-like valve member, the abutment surface being operable to tilt, distort or both tilt and distort the portion of the valve member into sealable engagement with the valve seat upon hinging of the float arm in a given direction.

2. A float valve according to claim 1 wherein the valve member is an elastomeric annular member and the engaged portion is a selectable portion of the member.

3. A float valve according to claim 1 wherein the pivot means limits the movement of the float to the given direction.

4. A float valve according to claim 1 wherein the spigot is partly conical.

5. A float valve according to claim 1 wherein said spigot and orifice walls extend from one end of the hollow body, the other end being a base end and containing a female thread, and a sealing washer surrounding the female thread.

6. A float valve according to claim 1 wherein said first end of the float arm has two abutment surfaces at right angles to each other, and selectively engageable against the valve member, such that if the valve body is to be mounted on a tank wall, it can be mounted either on a horizontal base wall or a vertical side wall of the tank.

7. A float valve according to claim 1 wherein said body has a pair of spaced ribs outstanding to one side, the ribs flanking the float arm, and said pivot means being a pivot pin which extends through the ribs and float arm.

8. A float valve according to claim 1 wherein the float end of the float arm has a plurality of depending spigots with barbs on each spigot, and the float comprises a foam polystyrene block penetrated and retained by the barbs.

* * * * *